United States Patent Office 3,543,283
Patented Nov. 24, 1970

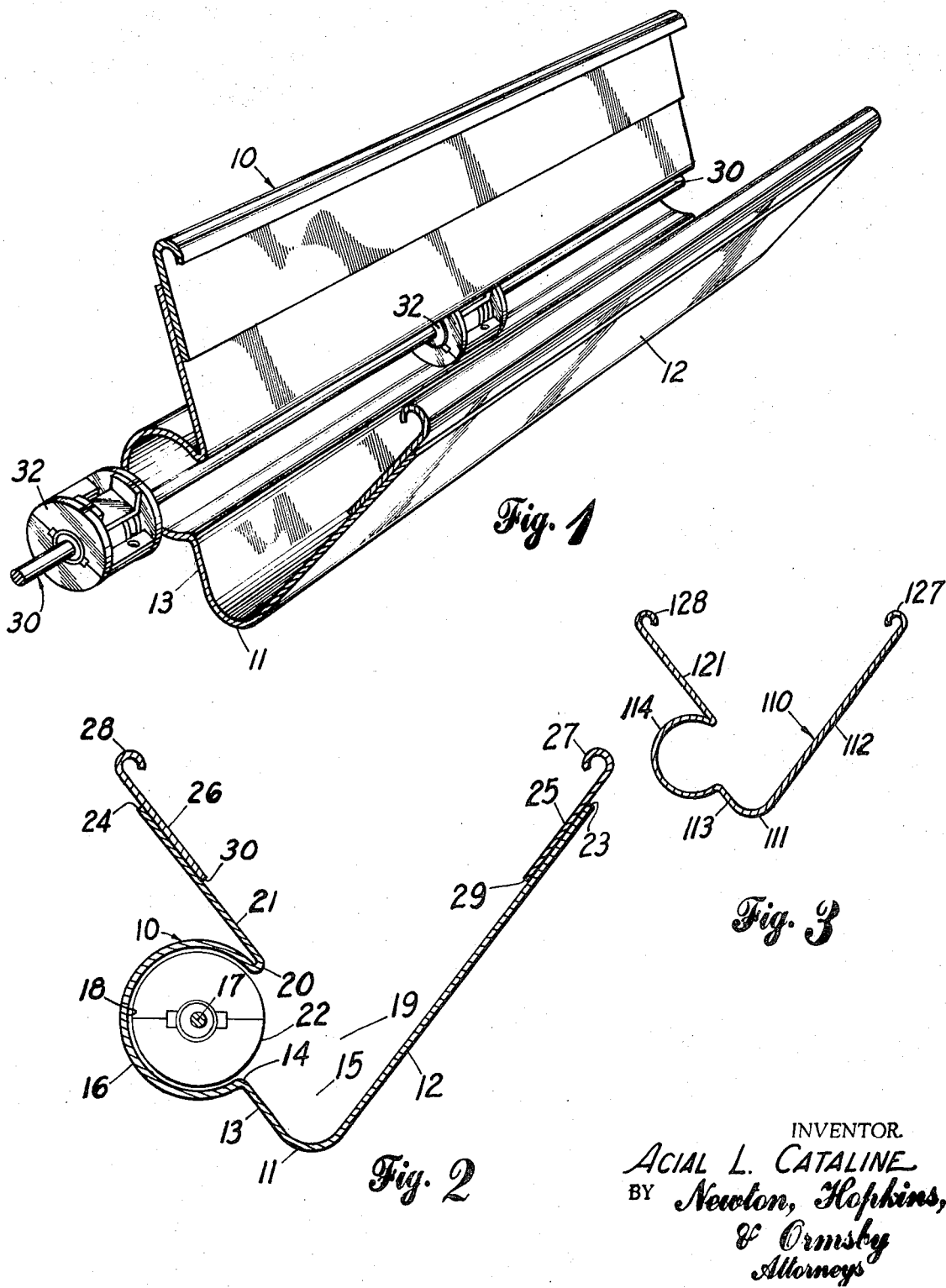

3,543,283
AUTOMATIC TYPE POULTRY FEEDER TROUGH
Acial L. Cataline, Canton, Ga., assignor to National Service Industries, Inc., Atlanta, Ga., a corporation of Delaware
Filed Oct. 17, 1968, Ser. No. 768,385
Int. Cl. A01k 39/00
U.S. Cl. 119—61                    12 Claims

ABSTRACT OF THE DISCLOSURE

A poultry feeder trough having a feed tube integrally formed in one side of the trough.

BACKGROUND OF THE INVENTION

This invention relates to a Poultry Feeder Trough of the type associated with an automatic feeder distribution system, and more particularly to a feeder which dispenses feed throughout its length.

In the past, poultry feeders of the general type here described have been devised and are widely used. U.S. Pat. No. 2,738,766 depicts one such device; U.S. Pat. No. 3,199,493 depicts another such device; and U.S. Pat. No. 2,794,421 depicts still another device. Such prior art devices are relatively expensive to manufacture, and involve the welding or securing together of a number of different parts in order to produce the trough. Thus, such prior art devices are relatively expensive and are subject to local action, due to the internal stresses of the metal caused by welding, in the event that welding is employed.

BRIEF SUMMARY OF THE INVENTION

Briefly described, the present poultry feeder trough which overcomes the disadvantages described above includes a unitary trough, having on one side thereof an integrally formed cylindrical shaped inwardly and downwardly opening passageway through which a conveyor passes. The upper ends of the trough are provided with ledge strips which are inwardly rolled to provide, along the upper edges thereof, rounded ledges which will not harm the poultry.

Accordingly, it is an object of the present invention to provide an improved poultry feeder trough which is inexpensive to manufacture, durable in structure and efficient in operation.

Another object of the present invention is to provide a poultry feeder which can be manufactured using automatic equipment.

Another object of the present invention is to provide a poultry feeder which will permit the uniform distribution of feed throughout the length of the feeder system and which will maintain a suitable level of feed throughout the trough.

Other objetcs, features and advantages of the present invention will become apparent from the following description when taken in conjunction with the accompanying drawings wherein like characters of reference designate corresponding parts throughout the several views, and wherein:

BRIEF DESCRIPTION OF THE DRAWING FIGURES

FIG. 1 is a perspective fragmentary view of one of the feeder troughs constructed in accordance with the present invention;

FIG. 2 is a vertical sectional view of that portion of the feeder trough illustrated in FIG. 1; and FIG. 3 is a cross-sectional view, on a reduced scale of a second embodiment of the invention.

DETAILED DESCRIPTION OF THE INVENTION

Referring now in detail to the embodiments chosen for the purpose of illustrating the present invention, it being understood that in its broader aspects, the present invention is not limited to the exact details herein depicted, numeral 10 denotes generally the trough portion of the feeder system which is preferably approximately ten feet long and can be interconnected with additional sections of trough portions 10 by suitable connectors (not shown) to form a continuous trough. Usually such continuous troughs are connected together to form a continuous rectangular feeder system; however, they may be any predetermined shape, as desired.

Each trough portion 10 in FIGS. 1 and 2 includes a straight concaved U-shaped bottom 11 which is curved about a longitudinal axis 15 throughout the length of trough section 10. One upper edge portion of bottom 11 merges with a relatively wide or high, major, upwardly and outwardly extending, side wall 12, while the other upper edge portion merges with a relatively narrow, minor or lower, upwardly and outwardly extending side wall 13.

The side wall 13 terminates in a straight edge or lower lip 14, well within the confines of trough portion 10, the edge or lip 14 being parallel to the axis 15 of the bottom 11. Lip 14 forms a common edge with and the sole support for a tubular downwardly and inwardly opening cylindrical feed tube 16, the axis 17 of which is parallel to the axis 15 of bottom 11.

Tube 16 is disposed above and to one side of bottom 11 and defines a tubular passageway 18, the lowermost portion of which is below the height of common edge or lip 14. Therefore, the common edge or lip 14 forms a threshold over which the feed is urged when being transferred from the passageway 18 into the trough chamber 19, defined by the upwardly diverging walls 12 and 13. It is now seen that the feed tube 16, in cross-section, curves downwardly and outwardly from edge 14 and thence upwardly and inwardly in an arcuate path to terminate at a common edge or upper lip 20.

Carried by lip 20 is an upwardly and outwardly extending upper side wall 21 which is disposed parallel to and spaced inwardly from lower wall 13. Thus lip 20 is generally vertically above but overlies or protrudes inwardly of the lower lip 14. The lips 14 and 20 are parallel to each other and axes 15 and 17. Furthermore, the lips 14 and 20 are sapced form each other to define a feed discharge opening 27 throughout their lengths, the opening 27 extending over approximately a quadrant of the tube 14, i.e., in cross-section as viewed in FIG. 2, from approximately 60 degrees and to approximately 135 degrees of the circle circumscribed around the axis 17.

It is, therefore, seen that the opening 27 is essentially rectangular and is essentially a vertical opening, through which the feed is introduced into the trough chamber 19 of the feeder trough.

It will be observed that, while the upper side wall 21 is approximately tangential to the tube 16, the lower wall 13 is disposed approximately radially thereof. Thus, the angle formed by the merging portions of tube 16 and wall 13 define what might be considered an obtuse angle while the merging portions of tube 16 and wall 21 form what might be considered an acute angle.

The walls 12, 13 and 21 are respectively rectangular in shape, each being the same length; however, wall 13 has a shorter vertical width than wall 21 and wall 21 has a shorter width than wall 12. The upper edges 23 and 24 of walls 12 and 21 respectively terminate in approximately the same horizontal plane.

In the embodiment of FIGS. 1 and 2, the inner surfaces of walls 12 and 21 carry a pair of flat rectangular edge plates or ledge strips 25 and 26, the upper end portions of which extend above edges 23 and 24 and are gently curve inwardly to form rounded ledges 27 and 28, respectively. The lower edges 29 and 30 of plates 25 and 26 form shoulders within the trough chamber 19 for arresting upward movement of the feed.

In the smaller troughs, as illustrated in FIG. 3, it is found desirable to create the trough 110 of unitary construction such that the ledges 127 and 128 are inwardly turned upper end portions of the upwardly diverging opposed walls 112 and 121. In FIG. 3 the bottom 111, the side wall 113, and the feed tube 116 are identical to their corresponding elements in the preceding embodiment.

In the troughs illustrated, the conveyor chains such as chain 31 are identical to the conveyors illustrated in U.S. Pat. Nos. 2,794,421 and 3,199,493. Hence, no detailed discussion of such conveyor chain 31 is required. Suffice it to state that the conveyor chain 31 includes spaced rods 32 connected together by sprockets 33, which have flat radial surfaces for sweeping the feed forwardly in tube 16 or 116. The chain 31 is received in the tube 16 or 116 and moves axially thereon. The sprockets 33 of the chain 31 are of slightly less diameter than the inside diameter of tube 16 or 116 and, hence, readily slide along the tube as the conveyor 31 is moved, thereby urging feed ahead of the sprockets 33. This gradually distributes the feed throughout the trough chamber 19 until the feed has reached a height in the trough 10 approximately level with the edge 20.

It will be understood that the mechanism driving the chain 31 and the hopper (not shown) for the trough are identical to the mechanism illustrated in Pat. 2,794,421, and hence is not repeated here.

It is now seen that the feed trough has the feed tube integrally formed in one side of the trough by the deformation outwardly of the side. The trough described above, therefore, is quite economical to manufacture and may be readily formed in a continuous fashion and cut to length, as desired.

It will be obvious to those skilled in the art that many variations may be made in the embodiments here chosen for the purpose of illustrating the present invention without departing from the scope thereof as defined by the appended claims.

I claim:
1. A poultry feeder trough comprising:
  (a) a straight bottom having a pair of opposed edges;
  (b) a major wall extending upwardly from one edge of said straight bottom;
  (c) a minor wall extending upwardly from the other edge of said bottom, said minor wall being in spaced opposed relationship to said major wall for defining an open trough chamber therebetween, said minor wall having a straight upper edge parallel to said bottom and terminating below the level of the upper edge of said major wall;
  (d) an upper wall disposed above said minor wall, said upper wall having a lower edge above said upper edge of said minor wall; and
  (e) a tubular feed tube through which a conveyor passes, said feed tube having an axis lying parallel to said bottom, said feed tube being connected to said upper wall along said lower edge, said feed tube being connected to said minor wall along said upper edge, said lower edge being parallel to said bottom and being spaced below said upper edge, said upper edge and said lower edge defining a feed discharge opening from said tubular feed tube into said open trough chamber.

2. The structure defined in claim 1 wherein the bottommost portion of said feed tube is below said lower edge for producing a threshold over which feed carried by said feed tube and moved by said conveyor passes in movement from said feed tube to said open trough chamber.

3. The structure defined in claim 1 wherein said major wall and said minor wall diverge upwardly.

4. The structure defined in claim 1 wherein said feed tube is cylindrical.

5. The structure defined in claim 4 wherein said minor wall is disposed approximately radially of said feed tube.

6. The structure defined in claim 5 wherein said upper wall is approximately parallel to said minor wall and approximately tangential to said feed tube.

7. The structure defined in claim 1 wherein said upper wall and said minor wall are disposed parallel to each other and said major wall diverges upwardly from said minor wall and said upper wall.

8. The structure defined in claim 1 wherein said bottom is rounded about a longitudinal axis within the trough chamber and said feed tube is above and to one side of said bottom.

9. The structure defined in claim 1 wherein said feed tube is disposed outwardly of the trough chamber defined by the walls.

10. The structure defined in claim 1 including inwardly rolled rounded edges on the upper edge portions of said upper wall and said major wall.

11. The structure defined in claim 1 wherein said feed tube, said upper wall, said lower wall, said bottom, and said major wall are formed from a unitary sheet of metal.

12. The structure defined in claim 1 wherein said upper edge is inwardly of and overlies said lower edge.

References Cited

UNITED STATES PATENTS

| | | | |
|---|---|---|---|
| 2,794,421 | 6/1957 | Rose et al. | 119—52 |
| 3,199,493 | 8/1965 | Hart | 119—52 |
| 2,914,024 | 11/1959 | Hobbs | 119—54 |
| 2,918,037 | 12/1959 | Polley | 119—52 |
| 3,115,117 | 12/1963 | Brelsford | 119—56 |
| 3,199,493 | 8/1965 | Hart | 119—52 |

ALDRICH F. MEDBERY, Primary Examiner

U.S. Cl. X.R.

119—52